United States Patent
Loken et al.

(10) Patent No.: US 6,234,278 B1
(45) Date of Patent: May 22, 2001

(54) ANCHOR PLATE FOR A BRAKE ASSEMBLY

(75) Inventors: Philip Ingmar Loken, Edwardsburg, MI (US); Robert Lee Wagner, Plymouth; Steven Arthur Lemaire, South Bend, both of IN (US)

(73) Assignee: Robert Bosch Corporation, Broadview, IL (US)

(*) Notice: Subject to any disclaimer, the term of this patent is extended or adjusted under 35 U.S.C. 154(b) by 0 days.

(21) Appl. No.: 09/467,473

(22) Filed: Dec. 20, 1999

(51) Int. Cl.[7] .................................................. F16D 63/00
(52) U.S. Cl. ........................................ 188/70 R; 248/674
(58) Field of Search .............................. 188/18 R, 70 R; 29/434, 469; 248/674, 27.3, 56, 65, 74.1, 74.2

(56) References Cited

U.S. PATENT DOCUMENTS

| | | | |
|---|---|---|---|
| D. 344,058 | * 2/1994 | Jones | D12/180 |
| 3,822,049 | * 7/1974 | Saunders | 248/203 |
| 4,150,736 | * 4/1979 | Marti | 188/332 |
| 5,356,105 | * 10/1994 | Andrews | 248/221.3 |
| 5,454,543 | * 10/1995 | Carrico | 248/674 |
| 5,520,607 | * 5/1996 | Frassica et al. | 600/102 |
| 5,590,742 | * 1/1997 | Gutelius | 188/70 R |
| 5,865,275 | * 2/1999 | Anger et al. | 188/18 A |
| 6,042,062 | * 3/2000 | Sugiyama | 248/65 |
| 6,158,709 | * 12/2000 | Culp et al. | 248/674 |

* cited by examiner

Primary Examiner—Douglas C. Butler
Assistant Examiner—Xuan Lan Nguyen
(74) Attorney, Agent, or Firm—Leo H McCormick, Jr.; Warren Comstock

(57) ABSTRACT

An anchor plate for a brake assembly and a method of attachment to an annular rib of axle tube of a vehicle. The anchor plate which defines a backing plate for a drum brake and guide rails for a caliper of a disc brake has a flange with a keyhole having with an arcuate length approximately equal to an axle retained in the axle tube. In assembly, the anchor plate is moved in an angled plane toward the axle until the keyhole moves past the axle. The anchor plate is rotated into radial alignment with axis of the axle and the flange is aligned with the axle tube. Then the flange is axially moved onto the axle tube until the flange engages the annular rib. Bolts are located in holes in the flange to fix the anchor plate to the axle tube. Thereafter, a bracket is attached to the anchor plate to position a cantilever member which retains a cable sheath is aligned with a lever opening in the anchor plate.

7 Claims, 3 Drawing Sheets

ANCHOR PLATE FOR A BRAKE ASSEMBLY

This invention relates to an anchor plate for use with a disc brake and a drum brake having a mounting flange with a keyhole opening for ease in attachment to an axle housing of a vehicle.

BACKGROUND OF THE INVENTION

U.S. Pat. No. 5,180,037 disclose structure commonly referred to as drum-in-hat brake assembly wherein a drum brake is combined with a disc brake, the drum brake providing a mechanical operated parking brake while the disc brake provides a service brake for a vehicle. In this assembly, an anchor plate fixed to an axle tube of the vehicle functions both as a mounting support for the backing plate of the drum brake and as guide rails for the disc brake. A backing plate for the drum brake is attached to the anchor plate in a manner such as disclosed in U.S. Pat. Nos. 5,529,149 and 5,957,247. The drum brake is first fixed to the axle tube as a subassembly are typically assembled at one location and sent to another location or station for a final assembly on a vehicle. After the axle is attached to the vehicle, an actuation cable that passes through a guide on the anchor plate is attached to a lever that extends from the actuator of the drum brake to complete the parking brake assembly. Thereafter, a rotor is attached to the axle and a caliper is affixed to the rails to complete the installation of the disc brake for the brake assembly. This brake assembly process is satisfactory and adequate for most applications, however, because the anchor plate is often made of a cast material and the location of the cable guide it is possible to either crack or break the guide off of the anchor plate during shipping from one location to the final assembly. Further, in some instances after extended periods of use, the guide rails for the disc brake on the anchor plate may develop grooves which can impede smooth sliding of a caliper on the rails. In any event, when circumstances make it necessary to replace an anchor plate, it becomes necessary to open the differential of the vehicle, remove a fastening pin which connects the axle to the differential in order to pull the axle from the axle tube. Thereafter, the bolts that hold the anchor plate to an annular rib on the axle tube are removed and the anchor plate axially pulled of the axle tube. This removal process is both time consuming and involves components such as the axle which is not directly associated with the anchor plate be removed before a new anchor plate can be attached to the axle tube. Also, when an anchor plate needs to be replaced for a vehicle in the field, oil present in the transfer case must be replaced or at least saved in a container until the axle is reconnected to the differential.

SUMMARY OF THE INVENTION

A primary object of the present invention is to provide structure whereby an anchor plate for a brake assembly can be removed and replaced on an axle tube without the need to remove an axle connected to a differential which drives a wheel assembly. In the brake assembly of the present invention, an anchor plate, which has a flange with a keyhole with an arcuate length approximate equal to the diameter of the axle, is affixed to the axle tube through the following steps. The anchor plate with its keyhole is moved toward the axle in an angled plane between a hub on the axle and the end of the axle tube of the vehicle. When the keyhole passes the center of the axis of the axle, the anchor plate is then rotated into a plane perpendicular to the axis of the axle. The flange on the anchor plate is then aligned with the peripheral surface on the end of the axle tube and the anchor plate axially moved into engagement with the annular rib on the axle tube. Bolts are then placed through axial holes in the flange to affix the anchor plate to the annular tube and locate the rails with respect to the caliper of the disc brake. A bracket is then snapped onto the anchor plate and the parking brake cable attached to the actuation lever for the parking brake.

An advantage of this anchor plate resides in the ability to be removed from an axle tube without the need of first removing an axle connected to a differential which drives a wheel of the vehicle.

A further advantage of this anchor plate resides in the ability to replace a bracket for an actuation cable through a bayonet connection.

DETAILED DESCRIPTION

Figure 1:
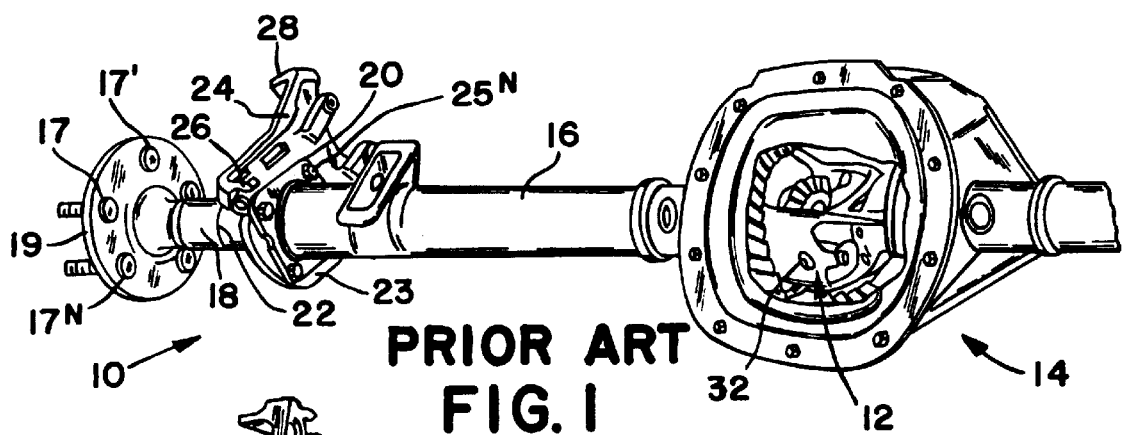
FIG. 1 is a prospective illustration of a prior art anchor plate arrangement for a brake assembly located on an axle tube.

FIG. 1 illustrates a prior art brake assembly 10 which includes a differential 12 retained in a transfer case 14. An axle tube 16 extends from the transfer case 14 and an axle 18 located in the axle tube 16 is connected to the differential 12. An anchor plate 24 which surrounds the axle tube 16 is connected to an annular shoulder or rib 20 located adjacent end 22 in a manner as type disclosed in U.S. Pat. Nos. 5,180,037; 5,529,149 and 5,957,247. The anchor plate 24 is designed to retain a drum brake which functions as a mechanical operated parking brake and a disc brake which functions as a service brake for a vehicle.

Brake assembly 10 is commonly manufactured by a supplier and sent to an axle assembly station or plant. Unfortunately, the anchor plate 24, which is typically made of a cast material to provide durability and strength for a brake system, can be subjected to damage as the axle assembly is in transit to the final assembly plant. Such damage often is exhibited by a broken or cracked cable guide 26 for an actuation cable of the drum brake or the first 28 and second 30 rails for the caliper of the disc brake which make it necessary for replacement of the anchor plate before final assembly can be achieved. In this situation, the transfer case 14 is opened and a pin 32 associated with the differential removed to allow axle 18 to be pulled from the axle case 16. Thereafter, bolts 25,25', ... 25" are removed from the rib or shoulder 20 and the anchor plate 24 is pull off the axle tube 16. A new and undamaged anchor plate 24 is obtained and the process reversed to reattach the anchor plate 24 to the axle tub 16, i.e. the anchor plate is placed on the peripheral surface 22 and continuous flange 23 bolted to rib or shoulder 20. Thereafter, axle 18 is reinserted in axle tube 16 and joined with differential 12 by pin 32 to again retain axle 18 in the transfer case 14. This replacement procedure while not complicated does require time and effort. However, since a most often cause of rejection is only a broken cable guide 26 the total rejection of an anchor plate 24 is quite costly due to a failure of a minimal portion of the structure. However, this procedure is more complicated when the assembly 10 is completed and replacement needs to be achieved on a vehicle which is in service as the oil in the transfer case 14 needs to be disposed of and a wheel which is attached to hub 19 on axle 18 by bolts 17,17', ... 17" and caliper also need to be removed. This above described method of assembly is supplanted by the anchor plate 40 shown in FIG. 2.

Figure 2:
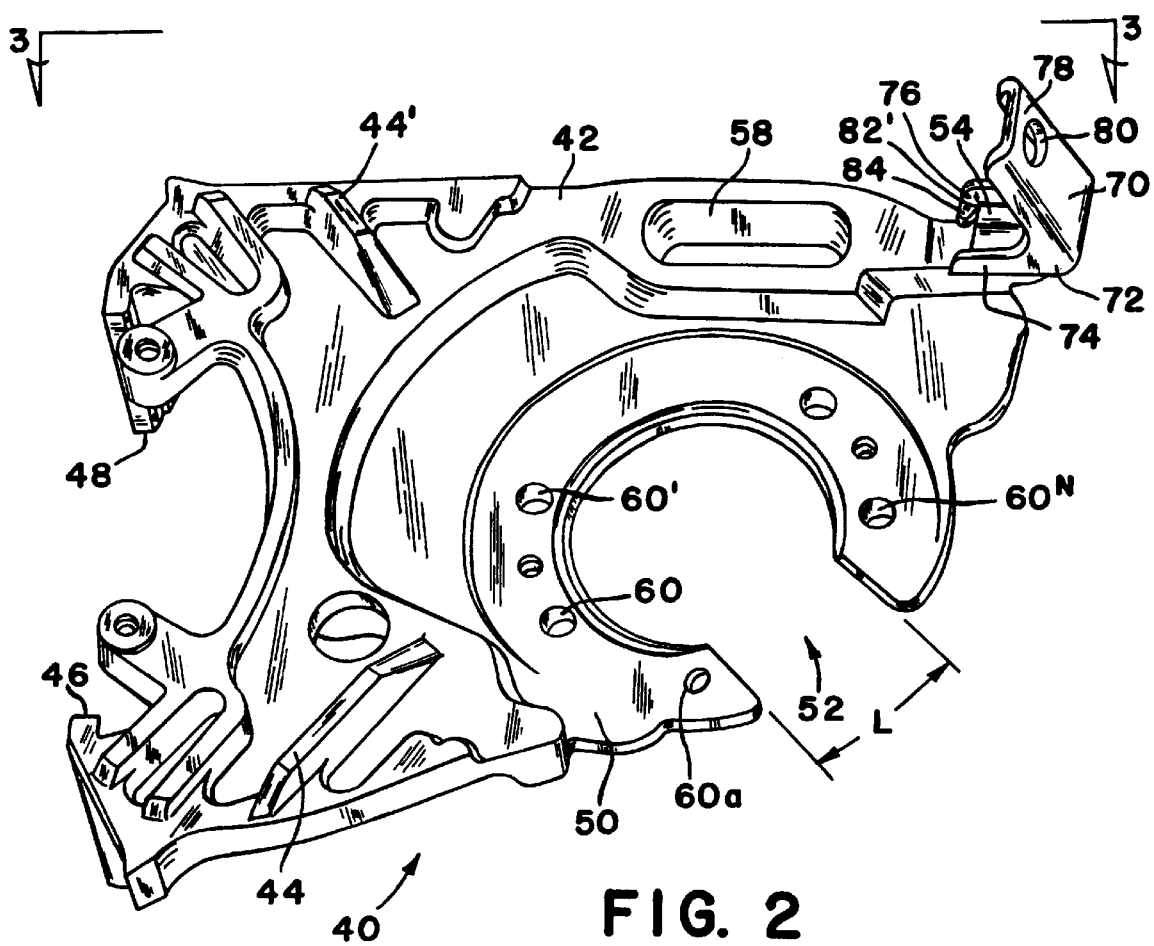
FIG. 2 is a prospective illustration of an anchor plate of the present invention for use in a brake assembly.
Figure 3:
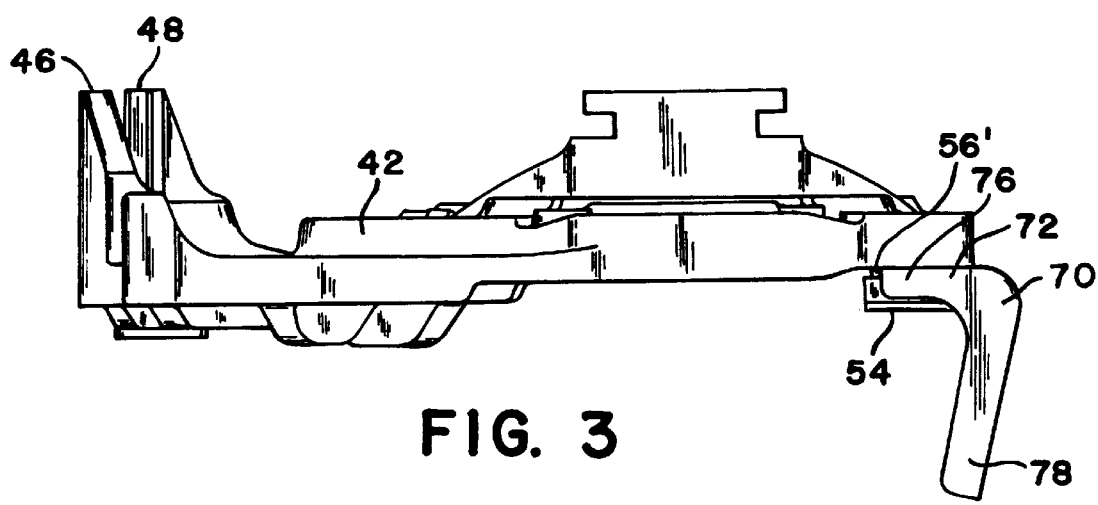
FIG. 3 is a sectional view taken along line 3—3 of FIG. 2.

Anchor plate 40 includes a substantially flat cast member 42, see FIGS. 2 and 3, with strengthening ribs 44,44' in areas of high stress 5 concentrations such as adjacent the first 46 and second 48 guide rails. Anchor plate 40 has a flange 50 with a keyhole 52 with a throat having an arcuate length "L" which is approximately a slight dimension larger than axle 18. A projection 54 extends from the flat cast member 42 adjacent opening 58 for actuation lever of the drum brake. The projection 54 has grooves 56,56', see FIG. 4, which are parallel to the flat cast surface 42. Flange 50 has a plurality of axial openings 60,60', ... 60" located therein for attachment to the annular rib or shoulder 20a on an axle tube 16a. The spacing and the number of openings 60,60', ... 60" may vary from application to application but current testing would suggest four bolts are sufficient to provide attachment, however, if further testing suggest that excessive stress is introduced into anchor plate 42 by torque applied to the first 46 and second 48 guide rails an additional opening 60a may be located adjacent the throat of keyhole 52.

Figure 4:
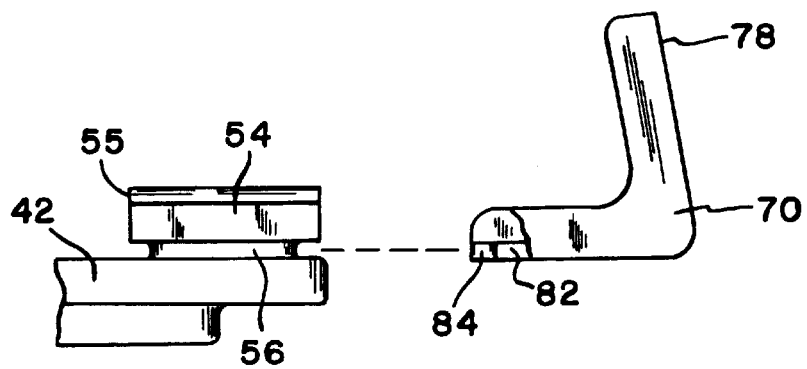
FIG. 4 is a side view of a bracket for retaining a sheath for a parking brake cable illustrated in FIG. 3 prior to the attachment to the anchor plate.

Bracket 70 as best shown in FIGS. 2, 3 and 4 has a base 72 with parallel first 74 and second 76 arms and a cantilever member 78 that extends in a plane approximately 10 degrees from a plane perpendicular to base 72. The cantilever member 78 has an opening 80 for receiving a sheaf of an actuation cable associated with the drum brake. The first 74 and second 76 arms each have a rib 82 with a nib 84 thereon. Rib 82 one each of the first 74 and second 76 arms are designed to be located a corresponding groove 56,56' on projection 54 while nibs 84 engage end 55 to lock bracket 70 onto projection 54 in such a manner that the cantilever member 78 is aligned with operating lever opening 58 in anchor plate 42.

Method of Assembly of Anchor Plate to an Axle Tube

When it is necessary to replace an anchor plate 40 in an brake assembly 10 and in particular when the vehicle is in service, the following steps illustrate how this attachment can be achieved in a manner that does not require removal of any other component from the vehicle chassis.

Figure 5:
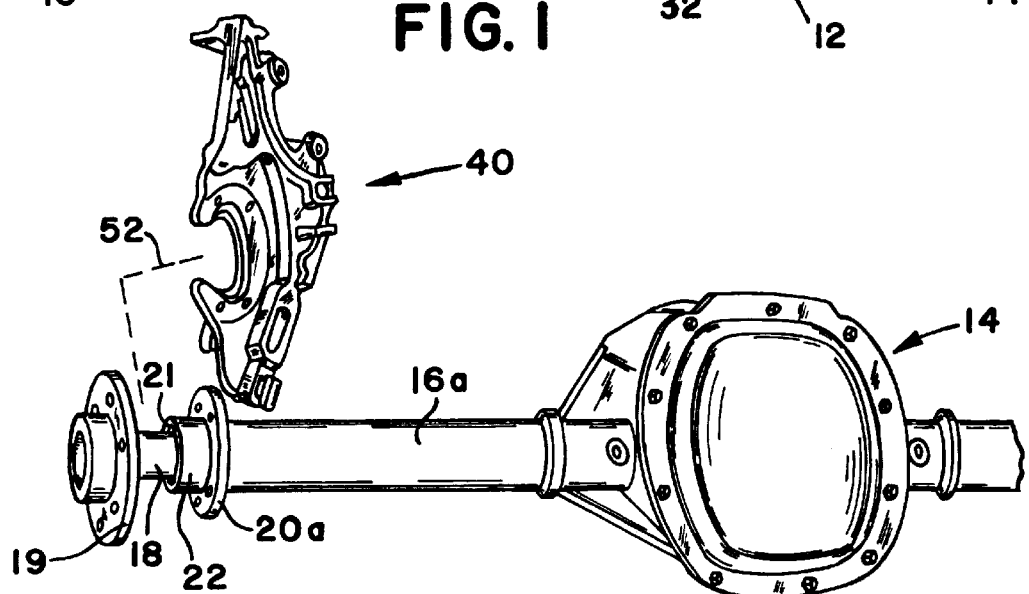
FIG. 5 is a prospective illustration showing an anchor plate prior to assembly on an axle tube of a vehicle.
Figure 6:
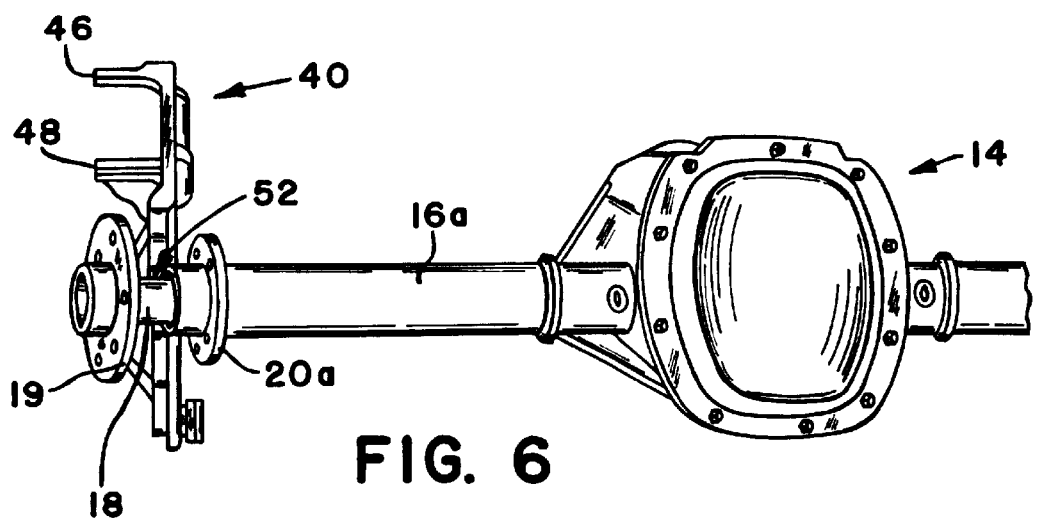
FIG. 6 is a prospective illustration during the assembly of an anchor plate on an axle tube when the apex of a keyhole on a flange of the anchor plate reaches the axis of the axle retained in the axle tube.
Figure 7:
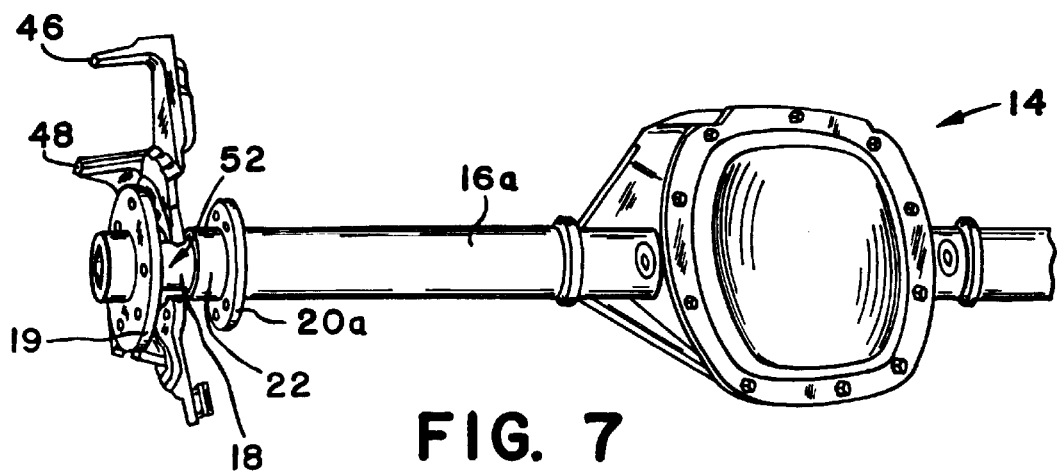
FIG. 7 is a prospective illustration during the assembly of an anchor plate on an axle tube when the flange is axial alignment with the peripheral surface of the axle tube.
Figure 8:
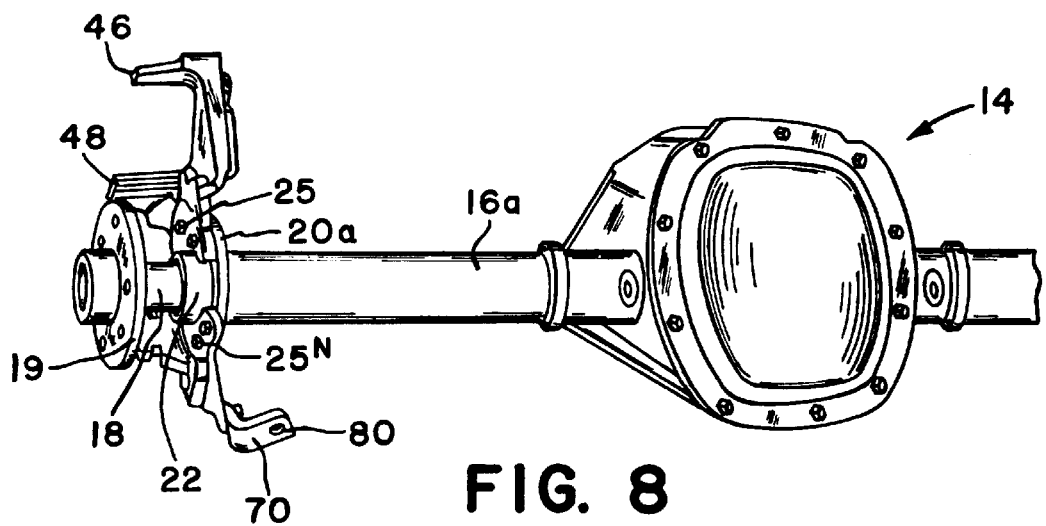
FIG. 8 is a prospective illustration of an anchor plate fixed to axle tube of a brake assembly.

An anchor plate 40 is obtained from a source of supply. The anchor plate 40 has a flange 50 with a radial keyhole 52 having an arcuate length L approximately equal but slightly larger that a diameter of axle 18. The flange 50 has a plurality of axial holes or openings 60,60', ... 60" that extend in an arc from adjacent the keyhole 52. The number of holes being selected to provide sufficient distribution of resistance forces carried by bolts 25,25', ... 25" which will later be used to attach the anchor plate 40 to annular rib 20a. Once the anchor plate 40 has been selected it is moved in an angular plane toward axle 18 as illustrated in FIG. 5. It is necessary that anchor plate 40 be moved along this angular plane until keyhole 52 moves past axle 18 as there is not sufficient distance between the end 21 of axle tube 16a and hub 19 to allow perpendicular attachment. Once the keyhole 52 moves past axle 18, anchor plate 40 is rotated into a radial plane perpendicular to axis of axle 18 as illustrated in FIG. 6. Thereafter, flange 50 is aligned with the peripheral surface 22 of axle tube 16a, as shown in FIG. 7 and axially moved on peripheral surface 22 until flange 50 engages annular rib 20a. A plurality of bolts 25,25', ... 2" are inserted in the axial openings 60,60', ... 6" to secure the anchor plate 40 to the axle tube 16a, as shown in FIG. 8.

To complete the assembly in the field, a bracket 70 is obtained from a source. The bracket 70 having a base 72 with a first 74 and second 76 arms extending therefrom and a cantilever member 78 with an opening 80 located therein. The bracket 70 is attached to projection 54 by placing ribs 82 thereon in grooves 56 on projection 54 and pushing on base 72 until nibs 84 move past end 55 to lock the bracket 70 onto projection 54. Once bracket 70 is locked onto projection 54, opening 80 in the cantilever member 78 is aligned with an opening 58 for an actuation lever associated with a drum brake. This process of replacing a bracket 70 can be achieve as a separate and independent function should a bracket be damaged in the field or when a brake cable needs to be replaced

We claim:

1. An anchor plate for a brake assembly having a flange attached to an annular rib on an axle tube, said anchor plate defining an attachment surface for a backing plate of a drum brake and first and second guide rails for a disc brake, said anchor plate being characterized by said flange having a keyhole with a throat having an arcuate length approximately equal to the diameter of an axle retained in said axle tube, said flange being retained in engagement with said annular rib by a plurality of bolts that extend through said flange and a projection for receiving a first arm and a second arm that extend from a base of a bracket, said bracket having a cantilever member that extends from said base with an opening therein for receiving a sheaf of an actuation cable for the drum brake.

2. The anchor plate as recited in claim 1 wherein said flange is characterized by a plurality of openings located in an arc beginning at first and second points adjacent said throat, said plurality of bolts passing through said plurality of openings for retaining said flange in engagement with said annular rib, said plurality of bolts transferring torque from said first and second guide rails into said axle tube.

3. The anchor plate as recited in claim 2 wherein said flange is further characterized by an additional opening located adjacent the throat of the keyhole for receiving an additional bolt to assist in the transfer of torque from said first and second guide rails into said axle tube.

4. The anchor plate as recited in claim 2 wherein said first and second arms are characterized by ribs that are located in corresponding grooves in said projection to maintain said bracket in a fixed position on said anchor plate.

5. The anchor plate as recited in claim 3 wherein said first and second arms include locking means to hold the bracket on said anchor plate.

6. A method of joining an anchor plate with an annular rib on an axle tube of a vehicle having a hub on an axle retained in the axle tube a fixed distance from said annular rib comprising the steps of:

obtaining an anchor plate from a source, said anchor plate having a flange with a radial keyhole having a throat with an arcuate length approximately equal to a diameter of said axle, said flange having a plurality of axial holes extending from adjacent said keyhole;

moving said anchor plate on an angle toward said axle until said throat of said keyhole moves past said axle;

rotating said anchor plate into a radial plane perpendicular to said axis of said axle;

aligning said flange with said axle tube;

axially moving said flange into engagement with said annular rib;

securing said flange to said annular rib with a plurality of bolts that extend through said plurality of axial holes;

obtaining a bracket from a source, said bracket having a base with a first and second arms and a cantilever member that extends from the base; and securing said bracket to said anchor plate by locating said first and second arms in grooves on a projection that extends from the anchor plate to align said cantilever member with an opening for a lever in said anchor plate.

7. The method as recited in claim 6 further including the step of:

moving said arms to a position on said anchor plate to allow ribs to engage a locking surface to assure that said bracket remains fixed to said anchor plate.

* * * * *